United States Patent

Shimazu et al.

[11] Patent Number: 5,749,943
[45] Date of Patent: May 12, 1998

[54] METHOD OF SELECTIVELY SEPARATING UNSATURATED HYDROCARBON

[75] Inventors: Akira Shimazu; Kenichi Ikeda; Hisao Hachisuka, all of Osaka, Japan

[73] Assignee: Petroleum Energy Center, Tokyo, Japan

[21] Appl. No.: 605,357

[22] Filed: Feb. 22, 1996

[30] Foreign Application Priority Data

| Feb. 27, 1995 | [JP] | Japan | 7-038851 |
| Sep. 11, 1995 | [JP] | Japan | 7-232413 |
| Sep. 11, 1995 | [JP] | Japan | 7-232426 |

[51] Int. Cl.$^6$ ............................................. B01D 53/22
[52] U.S. Cl. ............................. 95/50; 96/14; 585/818
[58] Field of Search .................. 95/45, 50; 96/4, 96/8, 10, 12–14; 585/818, 819

[56] References Cited

U.S. PATENT DOCUMENTS

| Re. 30,351 | 7/1980 | Hoehn et al. | 96/4 X |
| 2,930,754 | 3/1960 | Stuckey | 210/23 |
| 2,958,656 | 11/1960 | Stuckey | 210/23 |
| 3,789,079 | 1/1974 | Perry et al. | 585/818 |
| 3,822,202 | 7/1974 | Hoehn | 96/4 X |
| 4,532,029 | 7/1985 | Black et al. | 585/819 X |
| 4,532,041 | 7/1985 | Shuey et al. | 585/819 X |
| 4,614,524 | 9/1986 | Kraus | 95/50 |
| 4,705,540 | 11/1987 | Hayes | 96/4 X |
| 4,717,393 | 1/1988 | Hayes | 96/4 X |
| 4,717,394 | 1/1988 | Hayes | 96/4 X |
| 4,755,299 | 7/1988 | Brüschke | 95/45 X |
| 4,929,405 | 5/1990 | Kohn | 96/4 X |
| 4,932,982 | 6/1990 | Hayes | 96/4 X |
| 4,932,983 | 6/1990 | Hayes | 96/4 X |
| 5,015,268 | 5/1991 | Ho | 95/50 |
| 5,042,992 | 8/1991 | Blinka et al. | 96/14 X |
| 5,112,941 | 5/1992 | Kasai et al. | 96/14 X |
| 5,165,963 | 11/1992 | Matsumoto et al. | 427/245 |
| 5,178,940 | 1/1993 | Matsumoto et al. | 428/304.4 |
| 5,254,795 | 10/1993 | Boucher et al. | 585/819 |
| 5,310,415 | 5/1994 | Simmons et al. | 95/45 |
| 5,322,549 | 6/1994 | Hayes | 96/4 X |
| 5,430,224 | 7/1995 | Schucker | 585/819 X |

Primary Examiner—Robert Spitzer
Attorney, Agent, or Firm—Merchant, Gould, Smith, Edell, Welter & Schmidt, P.A.

[57] ABSTRACT

A homogeneous membrane or an asymmetric membrane which is made of polyimide resin containing fluorine as a main component and has high separation and permeation properties, is used in a method of separating unsaturated hydrocarbon from a mixture of unsaturated and saturated hydrocarbon. The method includes the steps of contacting the mixture onto the membrane made of the polyimide resin having a repeating unit shown in the following formula as a main component, selectively permeating unsaturated hydrocarbon through the membrane, and separating unsaturated hydrocarbon from the mixture. The membrane satisfies the condition of a solubility coefficient ratio between unsaturated and saturated hydrocarbon $\geq 1.2$ at 25° C. and more than 50 Torr when the absorption of hydrocarbon to the polyimide resin is in equilibrium.

Chemical Formula

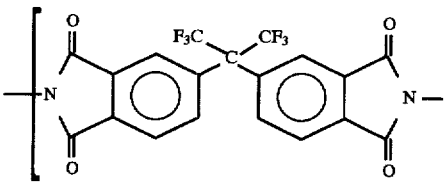

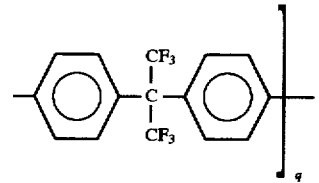

5 Claims, No Drawings

METHOD OF SELECTIVELY SEPARATING UNSATURATED HYDROCARBON

FIELD OF THE INVENTION

This invention relates to a method of selectively separating unsaturated hydrocarbon from a mixed material containing unsaturated and saturated hydrocarbon. More specifically, this invention relates to a method of selectively separating and condensing unsaturated hydrocarbon from a mixed material of unsaturated and saturated hydrocarbon generated by petroleum refining industries, petrochemical industries, and the like.

BACKGROUND OF THE INVENTION

Methods of separating unsaturated hydrocarbon from a mixed material of unsaturated and saturated hydrocarbon by applying a membrane in petroleum refining industries, petrochemical industries and the like have been researched over a long period of time, and some partial solutions were reported. For example, U.S. Pat. No. 2,958,656 discloses the method of separating unsaturated compounds, saturated compounds and aromatic compounds by the steps of supplying a hydrocarbon mixed material — naphtha — to a porous-type cellulose ether film, permeating some of the naphtha through the film, and removing the permeated material from the permeated side of the film by applying a clearing solvent. In U.S. Pat. No. 2,930,754, a portion of a mixed material distilled at the boiling point of gasoline is selectively permeated through a non-porous cellulose ether film, and the permeated material is removed by applying clearing gas or solvent onto the permeated side of the film, thus separating unsaturated hydrocarbon from hydrocarbon such as aromatic compounds. Most polyimides containing fluorine have high glass-transition temperatures and a rigid and bulky molecular chain structure, so that they are known as a permeation membrane material having excellent heat- and chemical-resisting properties and gas separating properties. For instance, Published Unexamined Japanese Patent Application No. Hei 5-7749 and U.S. Pat. No. 3,822,202, 3,899,309, 4,532,041, 4,645,824, 4,705,540, 4,717,393, 4,717,394, 4,838,900, 4,897,092, 4,932,982, 4,929,405, 4,981,497 and 5,042,992 disclose aromatic polyimide containing fluorine.

However, the conventional methods of separating unsaturated hydrocarbon by a membrane have poor properties for separating unsaturated hydrocarbon, and the permeation properties are also unsatisfactory. Therefore, the membrane separation methods of separating unsaturated hydrocarbon from a mixed material of unsaturated and saturated hydrocarbon are not widely applied in industries due to high cost and lack of satisfactory properties.

SUMMARY OF THE INVENTION

It is an object of this invention to solve the above-mentioned conventional problems by providing a method of selectively separating unsaturated hydrocarbon from a mixed material of unsaturated and saturated hydrocarbon, and a permeation membrane used for the method. The method has excellent properties and is economical. The membrane has high separation and permeation properties for unsaturated hydrocarbon.

In order to accomplish these objects, the method of selectively separating unsaturated hydrocarbon of this invention includes the steps of contacting a mixed material, that is, a mixture, of unsaturated and saturated hydrocarbon to one surface of a membrane, and selectively permeating the unsaturated hydrocarbon through the membrane so as to separate the unsaturated hydrocarbon from the saturated hydrocarbon.

It is preferable that the solubility coefficient of unsaturated hydrocarbon to polyimide resin (including fluorine) relative to the coefficient of saturated hydrocarbon to the polyimide resin is 1.2 or more at 25° C. and more than 50 Torr when the absorption of hydrocarbon relative to the polyimide resin including fluorine is in equilibrium. The absorption means the dissolution of gas in polymer. When the unsaturated and saturated hydrocarbon is in a liquid condition at atmospheric pressure or more, the hydrocarbon is changed into a gaseous condition by being introduced to a vacuum (reduced pressure) atmosphere, thus measuring the level at a hydrocarbon gas pressure of more than 50 Torr. The polyimide resin preferably has a weight-average molecular weight of 10,000 to 700,000.

It is also preferable that the polyimide resin including fluorine contains at least three fluorine atoms in its repeating unit.

It is further preferable that the polyimide resin including fluorine contains at least one —$CF_3$ group in its repeating unit.

It is preferable that the polyimide resin including fluorine comprises a repeating unit shown in the following Chemical Formula 1 as a main component:

Chemical Formula 1

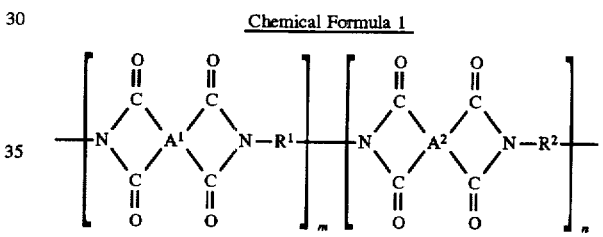

wherein $A^1$ and $A^2$ are tetravalent organic groups selected from the group consisting of tetravalent aromatic, alicyclic and aliphatic hydrocarbon groups; $R^1$ and $R^2$ are bivalent groups selected from the group consisting of aromatic hydrocarbon groups, alicyclic hydrocarbon groups, aliphatic hydrocarbon groups and bivalent organic groups in which the bivalent hydrocarbon groups are bonded by bivalent organic coupling groups; at least one of the organic groups selected from the group consisting of $A^1$, $A^2$, $R^1$ and $R^2$ contains at least three fluorine atoms; and m and n indicate a degree of polymerization in a positive natural number.

In Chemical Formula 1, the group $A^1$ and $A^2$ can be a tetravalent aromatic hydrocarbon group having one to four five-membered or six-membered rings which bond with each other directly or via a bivalent organic or inorganic group; Alternatively, $A^1$ and $A^2$ can be an alicyclic hydrocarbon group having four to eight carbon atoms; Further alternatively, $A^1$ and $A^2$ can be an aliphatic hydrocarbon group having four to six carbon atoms. The groups $R^1$ and $R^2$ can be a tetravalent aromatic hydrocarbon group having one to four five-membered or six-membered rings which bond with each other directly or via a bivalent organic or inorganic group; the definition of alicyclic hydrocarbon group for $R^1$ and $R^2$ is the same as above; and the aliphatic hydrocarbon group for $R^1$ and $R^2$ has two to six carbon atoms.

The above polyimide resin is preferably a random copolymer.

It is also preferable that the polyimide resin including fluorine comprises a repeating unit shown in the following Chemical Formula 2 as a main component Chemical Formula 2

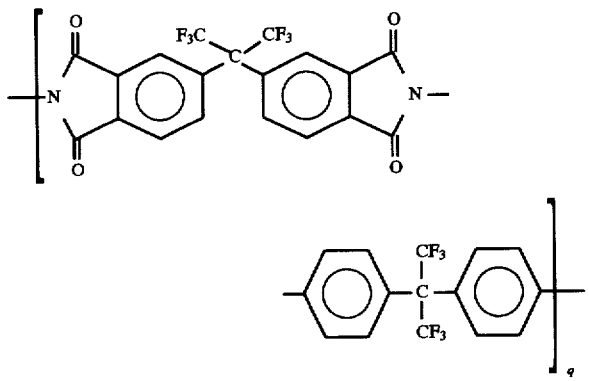

wherein q indicates a degree of polymerization in a positive natural number.

The membrane comprising polyimide resin that contains fluorine as a main component can be a homogeneous membrane or an asymmetric membrane. The homogeneous membrane essentially has the same structure for a front surface, back surface and inside of the membrane. In the asymmetric membrane, the front surface of the membrane has a dense structure while the inside and the back surface have a porous structure. These definitions of the homogeneous and asymmetric membranes are well known in this field.

It is preferable that the membrane used for the method of the invention comprises at least three fluorine atoms in a repeating unit constituting a polyimide resin containing fluorine.

It is also preferable that the repeating molecular unit constituting the polyimide resin containing fluorine comprises at least one —CF$_3$ group.

It is preferable that the polyimide resin containing fluorine essentially comprises a repeating unit shown in the Chemical Formula 1 as a main component.

It is also preferable that the polyimide resin containing fluorine essentially comprises a repeating unit shown in the Chemical Formula 2 as a main component.

The permeation membrane comprising polyimide resin containing fluorine as a main component can be a homogeneous membrane or an asymmetric membrane.

By contacting a mixture of unsaturated and saturated hydrocarbon on one surface of a membrane comprising polyimide resin which contains fluorine, the unsaturated hydrocarbon is selectively permeated through the membrane, thus separating the unsaturated hydrocarbon from the saturated hydrocarbon. This method has high separation and permeation properties and is economical. Depending on the properties of the hydrocarbon and pressure and separation processes, the method can be carried out by pervaporation. Pervaporation refers to a method of isolating a particular component from a mixture solution by contacting the solution with a film, and allowing the component to permeate the film and evaporate through the film, thereby separating the component in vapor phase.

When the ratio between the solubility coefficient of unsaturated hydrocarbon and that of saturated hydrocarbon is 1.2 or more, a preferable permeation membrane is made possible for selectively separating unsaturated hydrocarbon. The solubility coefficient is the volume of gas dissolved per unit pressure and polymer unit volume at a fixed temperature, so that the solubility coefficient can be used as an indicator of affinity between polymer and gas. The permeation properties of gas into homogeneous polymer are determined by permeation and diffusion processes of gas into polymer. More specifically, the permeation properties are expressed by the product of a solubility coefficient of gas into polymer and a diffusion coefficient of gas in polymer. By making use of a difference in solubility coefficients, a mixed gas can be separated into individual components. As a result, the inventors of this invention found that a membrane, made of polyimide resin containing fluorine and satisfying a solubility ratio (unsaturated/saturated hydrocarbon)≧1.2 when the absorption of hydrocarbon to the polyimide resin is in equilibrium at 25° C. and more than 50 Torr, has high separation and permeation properties for unsaturated hydrocarbon. With a solubility ratio less than 1.2, affinity between the polymer constituting the membrane and permeating components becomes small, so that the permeation properties of unsaturated hydrocarbon decline. When the absorption time of hydrocarbon to the polyimide resin containing fluorine is cut, the solubility ratio (unsaturated/saturated hydrocarbon) before absorption equilibrium may be larger than the ratio at the absorption equilibrium due to a difference in absorption behavior between unsaturated and saturated hydrocarbon. The solubility coefficient of unsaturated hydrocarbon to the polyimide resin containing fluorine is larger than that of saturated hydrocarbon by 1.2 times or more when the solubility ratio (unsaturated/saturated hydrocarbon)≧1.2.

If the polyimide resin containing fluorine has at least three fluorine atoms in its repeating molecular unit, it has superior selectivity.

The selectivity is also improved when the polyimide resin containing fluorine has at least one —CF$_3$ group in its repeating molecular unit. The polyimide resin containing fluorine preferably comprises from six to twelve fluorine atoms (in its repeating molecular unit), thus providing an unsaturated hydrocarbon permeation membrane with stable high properties. With twelve or more fluorine atoms, the cost of materials increases and the practicality of the membrane declines.

When the polyimide resin containing fluorine has the repeating molecular unit shown in the Chemical Formula 1 as a main component, the membrane is economical and practical.

The membrane is also economical and practical if the polyimide resin containing fluorine has the repeating molecular unit shown in the Chemical Formula 2 as a main component.

DETAILED DESCRIPTION OF THE INVENTION

This invention is directed to a method of selectively separating unsaturated hydrocarbon from saturated hydrocarbon by the steps of contacting a mixture of unsaturated and saturated hydrocarbon to one surface of a membrane (such as a homogeneous or asymmetric membrane) that is made of polyimide resin containing fluorine as a main component, and of permeating the unsaturated hydrocarbon through the membrane. The conventional membrane made of polyimide resin containing fluorine can be used in this invention.

The membrane made of polyimide resin containing fluorine is not limited to a particular one as long as the tetravalent organic group containing at least three fluorine atoms shown in the Chemical Formula 2 is a group in which the protons in a tetravalent organic group of $A^1$ or $A^2$ are replaced with fluorine atoms or a group containing fluorine atoms. However, it is preferable to use a tetravalent organic group in which at least one proton is replaced with a —$CF_3$ group. For example, a tetravalent organic group shown in the following Chemical Formula 3 can be applied in this invention.

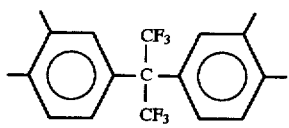

Chemical Formula 3

The bivalent organic group containing at least three fluorine atoms is not limited to a particular group as long as it is a group in which the protons of the bivalent organic group of $R^1$ or $R^2$ are replaced with fluorine atoms or a group containing fluorine atoms. However, it is preferable to use a group in which at least one proton of the bivalent group of $R^1$ or $R^2$ is replaced with one —$CF_3$ group. More specifically, bivalent organic groups shown in the following Chemical Formulas 4, 5, 6 and 7 are preferably used in this invention.

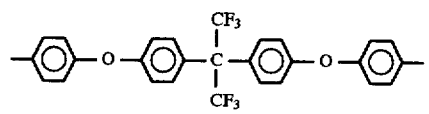

Chemical Formula 4

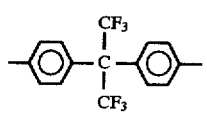

Chemical Formula 5

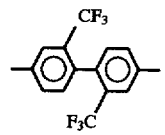

Chemical Formula 6

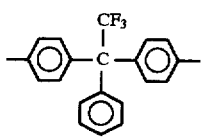

Chemical Formula 7

It is further preferable that the polyimide resin containing fluorine applied in this invention comprises a repeating unit shown in the Chemical Formula 2 as a main component.

The polyimide resin containing fluorine may be used alone or mixed with other materials. More specifically, the polyimide resin may be applied as a mixed material, a blend, a composition or a copolymer mixed with polysulfone, polyethersulfone or the like. The added material can be contained in an amount less than 50 mol %, preferably 20 mol %, more preferably 10 mol % of the whole polymer.

The conventional polymerization method disclosed in U.S. Pat. No. 3,959,350, for example, can be used to prepare the polyimide resin containing fluorine of this invention by using tetra carboxylic dianhydride and diamine component (in which at least one of the acid and amine components includes groups containing fluorine). As an example, tetra carboxylic dianhydride and diamine compound (in which at least one of the acid and amine components includes groups containing fluorine) are prepared at the same mol amount, and are agitated in a polar solvent at less than about 80° C., more preferably from zero to 60° C., thus polarizing polyamic acid. The polar solvent is not limited to a particular kind, but N-methyl pyrrolidone, pyridine, dimethyl acetamide, dimethyl formamide, dimethyl sulfoxide, tetramethyl urea, phenol, cresol or the like preferably can be used.

To the solution containing polyamide acid polar solvent, an imide reaction accelerator — a tertiary amine compound such as trimethyl amine, triethyl amine and pyridine, acetic anhydride, thionyl chloride, carbodiimide or the like — is added, and is agitated at 5–150° C., thereby carrying out an imide reaction. Without adding the imide reaction accelerator, the imide reaction can be carried out on the polyamic acid solution by heating the solution at 100–400° C., more preferably 120–300° C.

After the imide reaction, the solution is dropped in a large quantity of solution such as acetone, alcohol or water, and is then purified so as to provide preferable polyimide resin for a membrane of this invention.

Without adding the imide reaction accelerator, the imide reaction is carried out by heating polyamic acid powder, prepared by dropping polyamic acid solution into a large quantity of solution such as acetone and alcohol, or polyamic acid solid, prepared by evaporating solvent from the polyamic acid solution (polyamic acid powder may be prepared by adding precipitant or the like during the evaporation process and then filtered), at 100–400° C., thus preparing polyimide resin preferable for a membrane of this invention.

A method of forming a homogeneous membrane is not limited to a particular method. However, it is preferable to form the membrane by the steps of dissolving the polyimide resin containing fluorine in a solvent so as to prepare a cast solution, of molding the cast solution into a tubular shape, or flowing and casting the solution at a certain thickness on a flat plate or a tube which is made of glass, metal or plastic, and of heating the solution to remove the solvent.

A method of forming an asymmetric membrane is not limited to a particular method. However, the method is preferable which includes the steps of dissolving the polyimide resin containing fluorine into a predetermined organic solvent so as to prepare a cast solution, of flowing and casting the solution at a certain thickness on a flat plate or tube made of glass, metal or plastic or on a supporting body such as woven fabric and unwoven fabric, of dipping and holding in a solidifying solution (which does not dissolve the polyimide resin contained in the cast solution but has compatability with the organic solvent in the cast solution) or in the solidifying solution after pushing out the cast solution from a circular double-structure nozzle having the same core so as to prepare an asymmetric membrane, and of drying the membrane.

The solvent for the polyimide resin containing fluorine is not limited to a particular solvent, but N-methyl-2-pyrrolidone, dimethylacetamide, dimethylformamide, dimethylsulfoxide, diethyleneglycol dimethylether, 1,2-dimethoxymethane or the like may be used as the solvent. The organic solvent may be used alone or mixed with other materials. It is preferable to use an organic solvent having a small polarity and weak compatibility with the solidifying solution — for instance, diethyleneglycol dimethylether, 1,2-dimethoxymethane or the like. When the solvent having weak compatibility with the solidifying solvent is used as the cast solution, the speed of leaching of solvent contained in the cast solution into the solidifying solution is faster than the speed of forming a skin-type thin film during wet-type phase transversion film forming processes. As a result, an asymmetric membrane is formed which includes a porous layer and a homogeneous skin-type thin layer having no pin holes that reduce separation properties.

The solidifying solution is not limited to a particular solvent as long as it does not dissolve the polyimide resin containing fluorine and has compatibility with the organic solvent contained in the cast solution. However, water, alcohol such as methanol, ethanol and isopropylalcohol, or the mixed solution of these solutions can be applied. Among these solutions, water is particularly preferable. The temperature of the solidifying solution during the process of removing the organic solvent contained in the cast solution is not limited, but is preferably 0–50° C.

The polyimide solution is contained in the cast solution at 30–40% by weight, more preferably 10–30% by weight. If necessary, a welling agent, a dispersing agent, a thickener or the like may be added to prepare the cast solution. A doctor knife, a doctor plate, an applicator or the like may be used to flow and cast the cast solution. There is no limitation on the shapes of a membrane in this invention. However, a tube-type (including a hollow fiber type) membrane or a flat membrane is preferably used.

This invention will be described by referring to the following illustrative examples. However, this invention is not limited to these examples. The membrane is a homogeneous membrane in Examples 1, 2, 3 and 4 while an asymmetric membrane is used in Examples 5 and 6.

EXAMPLE 1

Polyimide resin containing fluorine and having the repeating unit shown in Chemical Formula 2 was prepared as follows. Polyamic acid was prepared by reacting 0.1 mol of 5,5'-2,2'-trifluoro-1-(trifluoromethyl) ethylidene-bis-1,3-isobenzofurandion (6FDA) and 0.1 mol of 2,2-bis(4-aminophenyl)hexafluoropropane (BAAF) in N-methyl-2-pyrolidone (NMP) for four hours. Then, an imide reaction was carried out for fifteen hours by adding 0.3 mol pyridine and 0.3 mol acetic anhydride into the polyamic acid. After the reaction, NMP was further added to the polyamic acid, and the NMP solution was diluted to 8% by weight. After dropping the NMP solution in a large amount of water, the solution was purified, thus providing the polyimide resin containing fluorine and having the repeating unit shown in Chemical Formula 2. The glass-transition temperature of the polyimide resin was 301° C. while the average molecular weight was 159,000.

Sixteen weight parts of the polyimide were diluted, and agitated at 100° C. for six hours with 84 weight parts of diethyleneglycol dimethylether as an organic solvent (A), thus dissolving the polyimide in the organic solvent. Then, a cast solution was prepared by filtering and then setting the polyimide solution still so as to remove bubbles. The cast solution was cast on a glass plate by an applicator of 20 cm width and 200 μm thickness, and was then heated at 110° C. for one hour, at 150° C. for one hour, and at 200° C. for three hours. As a result, a 20 μm thick homogeneous membrane made of polyimide containing fluorine was formed.

The solubility coefficient ratios between propylene and propane before and in absorption equilibrium at 25° C. and 2atm supply pressure were 3.6 and 1.4 respectively. Thus, the materials of the membrane and the solubility coefficient ratios satisfy the conditions of this invention. The separation and permeation properties of propylene and propane at 25° C. are shown in the following Table 1.

EXAMPLE 2

This example is the same as Example 1, except that n-butane, 1-butene and 1,3-butadiene were separated instead of propane. The solubility coefficient ratios between 1-butene and n-butane before and in absorption equilibrium were 5.6 and 1.7 respectively, and the ratios between 1,3-butadiene and n-butane before and in equilibrium were 5.6 and 1.7 respectively. Thus, the materials of the membrane and the solubility coefficient ratios satisfy the conditions of this invention. The results of this example are shown in Table 1 above.

EXAMPLE 3

The same processes as in Example 1 were carried out in this example, except that 1,4-phenylenediamine is used instead of 2,2-bis (4-aminophenyl)hexafluoropropane (BAAF) and NMP rather than diethyleneglycol dimethylether as an organic solvent (A). As a result, a homogeneous membrane made of polyimide containing fluorine and having a repeating unit shown in the following Chemical Formula 8 was formed.

Chemical Formula 8

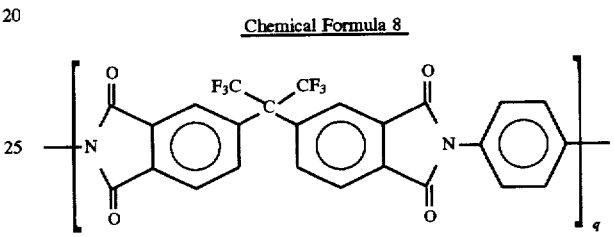

wherein q indicates a polymerization in a positive natural number.

The solubility coefficient ratio between propylene and propane in the absorption equilibrium at 25° C. and 2 atm supply pressure was 2.8. In other words, the materials of the membrane and the solubility coefficient ratio satisfied the conditions of this invention. The results of this example are shown in Table 1 below.

EXAMPLE 4

This example was the same as Example 3, except that n-butane, 1-butene and 1,3-butadiene were separated instead of propylene and propane. The solubility coefficient ratio between 1-butene and n-butane was 2.3 while the ratio between 1,3-butadiene and n-butane was 6.3. Thus, the materials of the membrane and the solubility coefficient ratios satisfied the conditions of this invention. The results of this example are shown in Table 1 above.

COMPARATIVE EXAMPLE 1

This example was the same as Example 1, except that a homogeneous membrane made of fluorine resin and sold in the market (12–14 μm thick Neoflone PFA manufactured by Daikin Industries, LTD.) and a 30 μm thick polyethylene homogeneous membrane (FC-50 manufactured by Okura Industries, LTD.) were used instead of a membrane made of polyimide resin containing fluorine. PFA is the abbreviation for tetrafluoroethylene-perfluoroalkylvinylether copolymer.

As a result, the solubility coefficient ratio of Nephrone PFA between propylene and propane was 0.97 and the ratio of polyethylene between propylene and propane was 0.99. In other words, the materials of the membrane and the solubility coefficient ratios did not satisfy the conditions of this invention. The results of this example are shown in Table 1 below. The results were inferior to those found in Example 1.

TABLE 1

| Example No. | Material | Permeating Components | A (a) | A (b) | B | C |
|---|---|---|---|---|---|---|
| Example 1 | Polyimide containing fluorine | propylene propane | 3.6 | 1.4 | $1.0 \times 10^{-10}$ $1.3 \times 10^{-12}$ | 77 |
| Example 2 | Polyimide containing fluorine | 1-butene n-butane | 2.6 | 1.4 | $9.7 \times 10^{-11}$ $8.0 \times 10^{-12}$ | 12 |
|  |  | 1,3-butadiene n-butane | 5.6 | 1.7 | $2.2 \times 10^{-7}$ $8.0 \times 10^{-12}$ | 28000 |
| Example 3 | Polyimide containing fluorine | propylene propane | — | 2.8 | $1.5 \times 10^{-11}$ $4.6 \times 10^{-13}$ | 33 |
| Example 4 | Polyimide containing fluorine | 1-butene n-butane | — | 2.3 | $7.5 \times 10^{-12}$ $3.2 \times 10^{-13}$ | 23 |
|  |  | 1,3-butadiene n-butane | — | 6.3 | $1.3 \times 10^{-8}$ $3.2 \times 10^{-13}$ | 41000 |
| Comparative Example 1 | Neoflone PFA | propylene propane | — | 0.97 | $9.6 \times 10^{-11}$ $3.7 \times 10^{-11}$ | 2.6 |
|  | polyethylene | propylene propane | — | 0.99 | $2.1 \times 10^{-9}$ $1.3 \times 10^{-9}$ | 1.6 |

A: Solubility Coefficient Ratio (–)
(a): Before Absorption Equilibrium
(b): In Absorption Equilibrium
B: Permeability Coefficient ($cm^3$ (STP)cm/$cm^2$ s cmHg)
C: Separation Factor (–)
Solubility Coefficient Ratio (Gas A/Gas B) = (Solubility Coefficient of Gas A)/(Solubility Coefficient of Gas B)
Permeability Coefficient = {(Permeation of Gas in a Normal Condition) × (Membrane Thickness)}/{(Area of Membrane) × (Permeation Time) × (Gas Pressure)}
Separation Factor(Gas A/Gas B) = {(Permeation Coefficient of Gas A)/(Permeability Coefficient of Gas B)

EXAMPLE 5

As in Example 1, polyimide containing fluorine and having the repeating unit shown in Chemical Formula 2 above was prepared. Polyamic acid was prepared by reacting 0.1 mol of 5,5'-2,2'-trifluoro-1-(trifluoromethyl) ethylidene-bis-1,3-isobenzofurandion (6FDA) and 0.1 mol of 2,2-bis(4-aminophenyl)hexafluoropropane (BAAF) in N-methyl-2-pyrolidone (NMP) solution for four hours. Then, an imide reaction was carried out for fifteen hours by adding 0.3 mol pyridine and 0.3 mol acetic anhydride. After the reaction, NMP was added to the polyamic acid solution, and the solution was diluted to 8% by weight, thus preparing NMP solution. After dropping the NMP solution in a large quantity of water, the solution was purified. As a result, polyimide containing fluorine and having the repeating unit shown in Chemical Formula 2 was prepared. The glass-transition temperature of the polyimide was 301° C. while the average molecular weight of the polyimide was 159,000.

The solubility coefficient ratio between propylene and propane in the absorption equilibrium at 25° C. and 2 atm supply pressure was 1.4.

Therefore, the materials of the membrane and the solubility coefficient ratio satisfied the conditions of this invention. Eighteen weight parts of polyimide containing fluorine and having the repeating unit shown in Chemical Formula 2 were added with 82 weight parts of diethylene glycol dimethyl ether, and were agitated at 100° C. for six hours to dissolve the polyimide. Then, the polyimide solution was filtered and set still so as to remove bubbles completely, thus preparing a cast solution. The cast solution was cast on a polyester unwoven fabric of 20 cm width and 300 μm thickness by an applicator, and the fabric was dipped and kept in water (solidifying solution) at 5° C. for one hour. Then, the fabric was washed with water and dried with air at room temperature, thus preparing an asymmetric membrane. The surface of the asymmetric membrane was coated with an elastomeric copolymer - crosslinking silicone resin solution (a mixed solution of 97wt % hexane and 3wt % RTV615 (Silicones) manufactured by General Electric Co.), and was then treated with heat at 110° C. for thirty minutes. Thus, elastomeric copolymer thin layers were formed and laminated. An asymmetric membrane having the elastomeric copolymer thin layers was evaluated and the results are shown in the following Table 2.

EXAMPLE 6

This example was the same as Example 5, except that n-butane, 1-butene and 1,3-butadiene were separated instead of propylene and propane. According to the evaluation, the solubility coefficient ratio between 1-butene and n-butane was 1.4 and the ratio between 1,3-butadiene and n-butane was 1.7. Thus, the materials of the membrane and the solubility coefficient ratios satisfied the conditions of this invention. The results of this example are shown in Table 2 above.

TABLE 2

| Example No. | Material | Permeating Components | A | B | C |
|---|---|---|---|---|---|
| Example 5 | Polyimide containing fluorine | propylene | 1.4 | $1.0 \times 10^0$ | 30 |
|  |  | propane |  | $3.3 \times 10^{-2}$ |  |
| Example 6 | Polyimide containing fluorine | 1-butene n-butane | 1.4 | $7.6 \times 10^{-1}$ $1.2 \times 10^{-2}$ | 63 |
|  |  | 1,3-butadiene n-butane | 1.7 | $8.9 \times 10^0$ $1.2 \times 10^{-2}$ | 740 |

A: Solubility Coefficient Ration (-)
B: Permeation Rate ($Nm^3/m^2$ h atm)
C: Separation Factor (-)
Permeation Rate = (Level of Permeation of Gas in a Normal Condition)/{(Area of Membrane) × (Permeation Time) × (Gas Pressure)}

As clearly shown in Table 2, the membrane of this example had high separation properties and permeability for unsaturated hydrocarbon.

According to these examples, a membrane having high permeability and separation properties for unsaturated hydrocarbon is formed by using polyimide resin containing fluorine as a main component. In the polyimide resin, unsaturated hydrocarbon has a higher solubility coefficient than saturated hydrocarbon by more than a predetermined ratio. By using this membrane, an economical, superior and practical method of separating unsaturated hydrocarbon from a mixture of unsaturated and saturated hydrocarbon is presented.

The invention may be embodied in other forms without departing from the spirit or essential characteristic thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A method of selectively separating olefin from a mixed gas of olefin and saturated hydrocarbon, comprising the steps of:

contacting said mixed gas onto one surface of a membrane comprising a polyimide resin, which comprises fluorine, as a main component;

wherein the polyimide resin comprises a repeating molecular unit selected from at least one of the following Chemical Formula A and Formula B as a main component:

Chemical Formula A

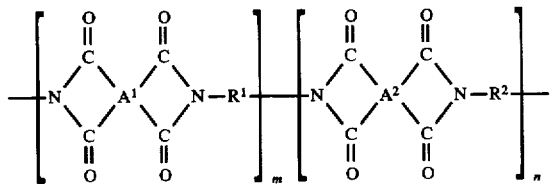

where $A^1$ and $A^2$ are tetravalent organic groups selected from the group consisting of aromatic, alicyclic and aliphatic hydrocarbon groups, said aromatic hydrocarbon group having one to four five-membered or six-membered rings which bond with each other directly or via a bivalent organic or inorganic group, said alicyclic hydrocarbon group having four to eight carbon atoms, said aliphatic hydrocarbon group having four to six carbon atoms; $R^1$ and $R^2$ are bivalent groups selected from the group consisting of aromatic hydrocarbon groups, alicyclic hydrocarbon groups, aliphatic hydrocarbon groups and bivalent organic groups in which said bivalent aromatic, alicyclic or aliphatic hydrocarbon groups are coupled with bivalent organic coupling groups, said aromatic hydrocarbon groups having one to four five-membered or six-membered rings which bond with each other directly or via a bivalent organic or inorganic group, said alicyclic hydrocarbon group having four to eight carbon atoms, said aliphatic hydrocarbon group having two to six carbon atoms; at least one organic group selected from the group consisting of $A^1$, $A^2$, $R^1$ and $R^2$ comprises at least three fluorine atoms; and m and n indicate a degree of polymerization and are positive natural numbers.

Chemical Formula B

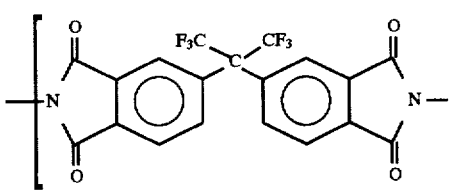

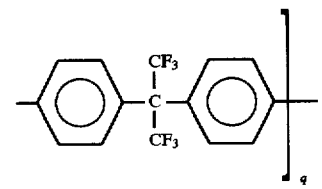

where q indicates a degree of polymerization and is a positive natural number, and permeating said olefin through said membrane, thus separating said olefin from said saturated hydrocarbon, wherein a solubility coefficient ratio between the olefin and the saturated hydrocarbon at 25° C. and 50 Torr is 1.2 or more when absorption of hydrocarbon to the polyimide resin that comprises fluorine is in equilibrium.

2. The method of claim 1, wherin the polyimide resin, which comprises fluorine, comprises at least three fluorine atoms in its repeating molecular unit.

3. The method of claim 1, wherein the polyimide resin, which comprises fluorine, comprises at least one —$CF_3$ group in its repeating molecular unit.

4. The method of claim 1, wherein the membrane comprising polyimide resin, which contains fluorine, as a main component is a homogeneous membrane.

5. The method of claim 1, wherein the membrane comprising polyimide resin, which contains fluorine, as a main component is an asymmetric membrane.

* * * * *